Figure 1:
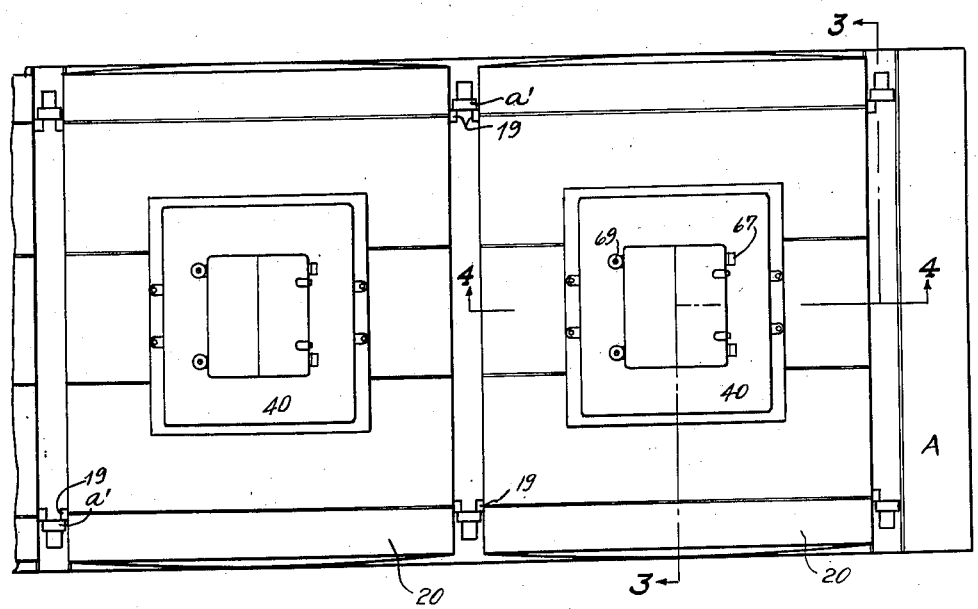

Feb. 13, 1940.     B. F. FITCH     2,189,787
DEMOUNTABLE TANK BODY
Filed July 28, 1936     4 Sheets-Sheet 1

INVENTOR.
Benjamin F. Fitch,
BY Davis, Golrick & Fear
ATTORNEYS.

Feb. 13, 1940.   B. F. FITCH   2,189,787
DEMOUNTABLE TANK BODY
Filed July 28, 1936   4 Sheets-Sheet 2

INVENTOR.
Benjamin F. Fitch
BY Bates, Golrick & Fear
ATTORNEYS.

Feb. 13, 1940.   B. F. FITCH   2,189,787
DEMOUNTABLE TANK BODY
Filed July 28, 1936   4 Sheets-Sheet 3

INVENTOR.
Benjamin F. Fitch
BY Bates, Goldrick & Feary
ATTORNEYS.

Feb. 13, 1940.  B. F. FITCH  2,189,787
DEMOUNTABLE TANK BODY
Filed July 28, 1936  4 Sheets-Sheet 4

INVENTOR.
Benjamin F. Fitch,
BY Oates, Golrick & Hearn
ATTORNEYS.

Patented Feb. 13, 1940

2,189,787

UNITED STATES PATENT OFFICE 2,189,787

DEMOUNTABLE TANK BODY

Benjamin F. Fitch, Greenwich, Conn., assignor to Motor Terminals, Inc., Cleveland, Ohio, a corporation of Ohio Application July 28, 1936, Serial No. 92,984

5 Claims. (Cl. 220—1)

This invention relates to a demountable tank for vehicles and especially to a tank which may be slid from one vehicle to another, such as from a highway truck to a railway vehicle or vice versa, or between a vehicle and a shipper's platform. My tank is designed particularly for the carrying of milk but may be used for other purposes. It provides a double shell tank with intermediate insulation and supporting bolsters which are directly secured to the underportion of the outer shell, these bolsters carrying parallel skid rails whereby the whole tank construction may be readily shifted from one support to another.

One of the objects of the invention is the provision of a tank readily constructed and effectively mounted on the supporting bolsters without requiring the use of the conventional hold-down straps, the tank being composed of inner and outer shells effectively braced and having insulation between them.

Another feature of the invention is concerned with the construction at the intake of the tank comprising a man-hole with a cover internally insulated and effectively hinged at the top of the tank and surrounded by a cat-walk for the operator.

Another feature of the invention is concerned with the provision of a pocket in the end portion of the tank in which the discharge valve is mounted, whereby a simple form of valve may be used and the same readily protected from the cold or direct rays of the sun.

Another feature of the invention relates to side skirts for the tank, which are removably mounted on the outer sides of the bolsters, enabling them to be used as signs, changed from time to time, if desired. A protective gutter is provided at the upper edge of the side skirts to prevent streaks on them from water on the upper portion of the tank.

Still another feature of the invention is concerned with the provision of a removable ladder to which a cat-walk is connected, this ladder being normally stored in idle space beneath the tank but available whenever desired to enable the operator to readily mount to the cat-walk about the filling opening.

The above outlined features and others contributing to the efficiency and convenience of the demountable tank will be more apparent from the following detailed description of a preferred embodiment shown in the drawings.

Figure 2:
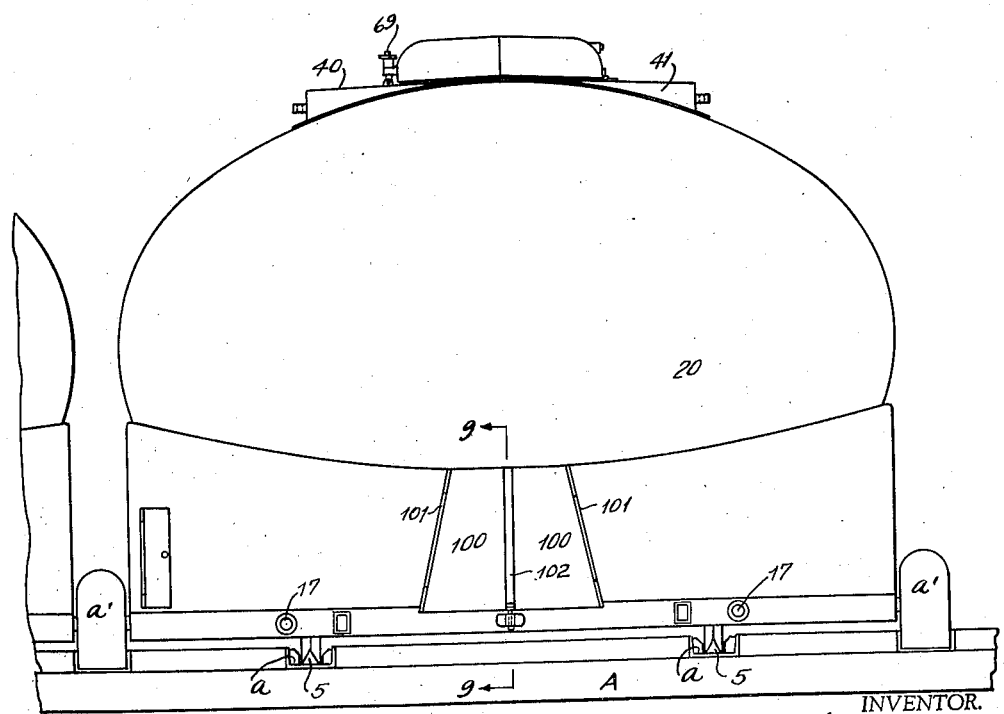
Figure 3:
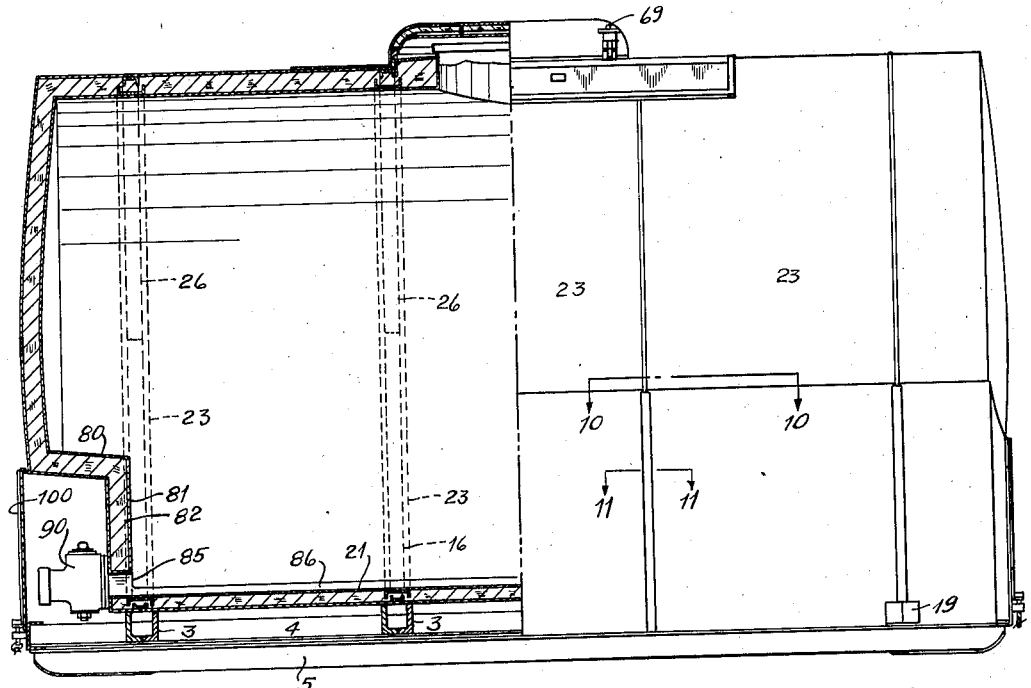
Figure 4:
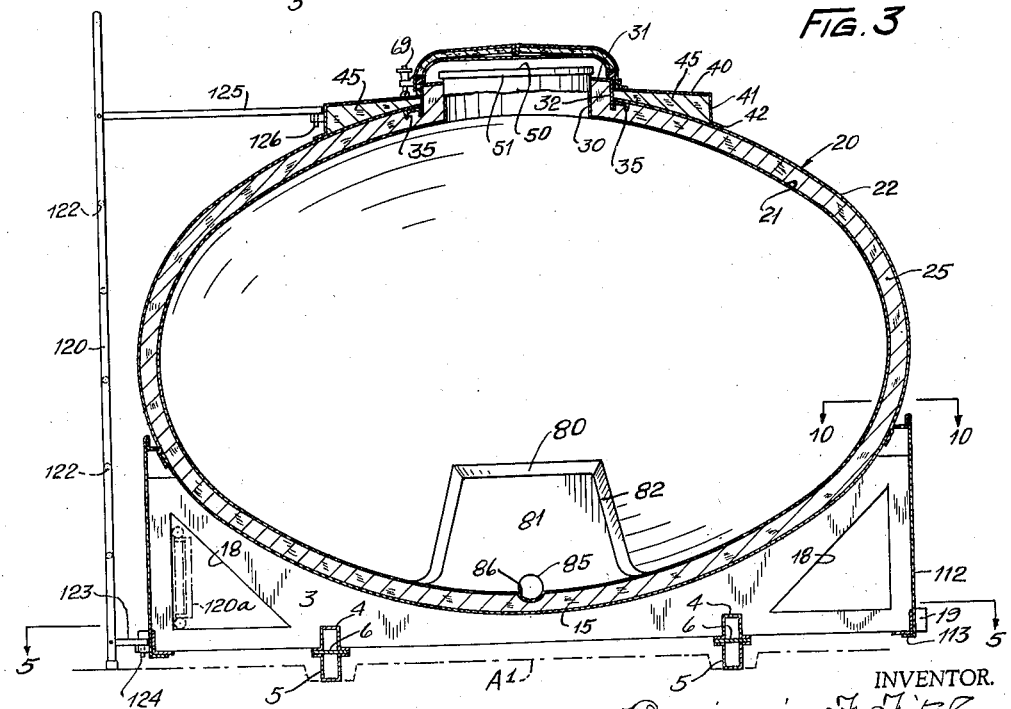
Figure 5:
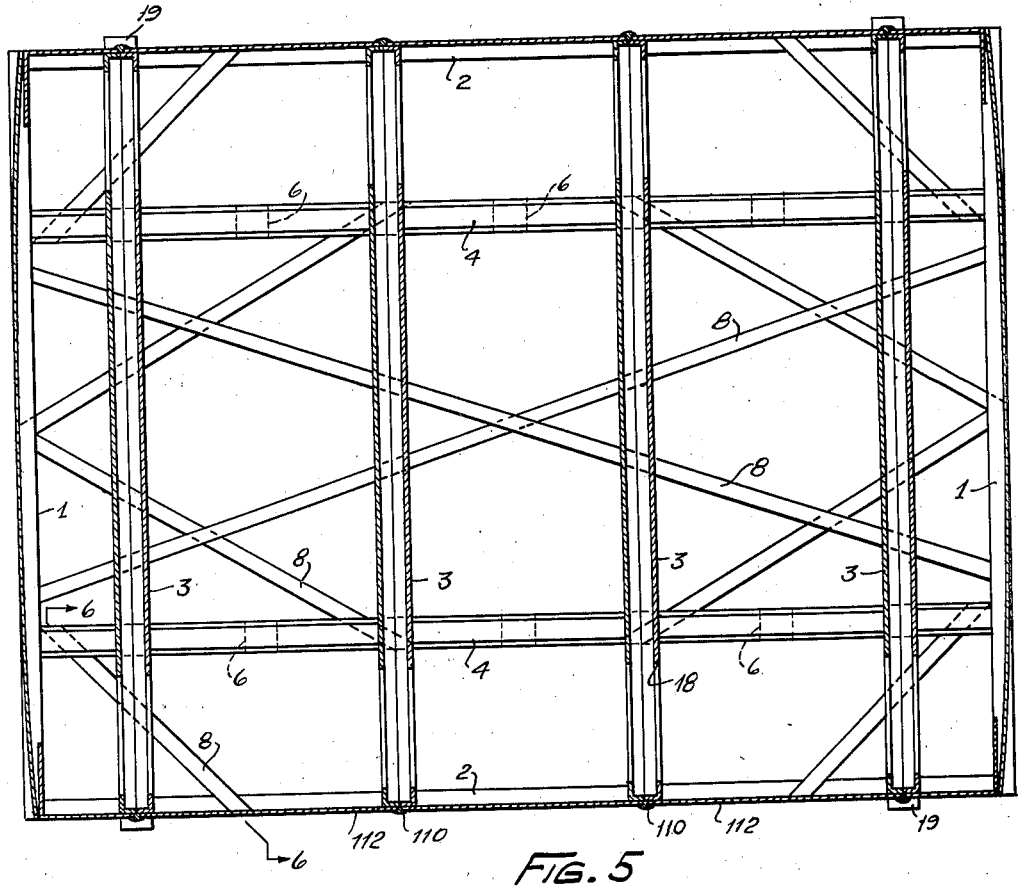
Figure 6:
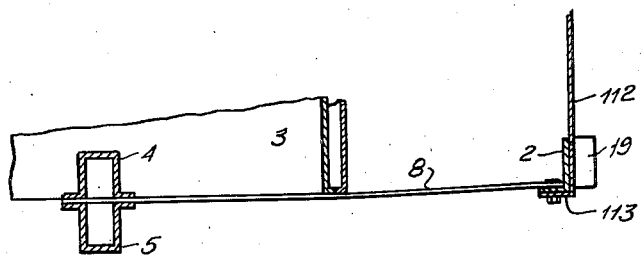
Figure 7:
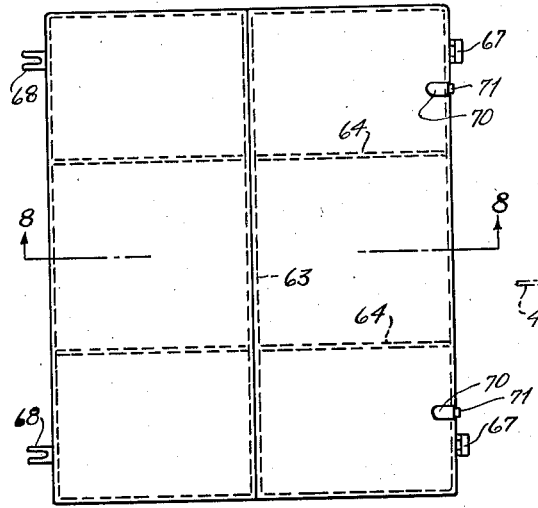
Figure 8:
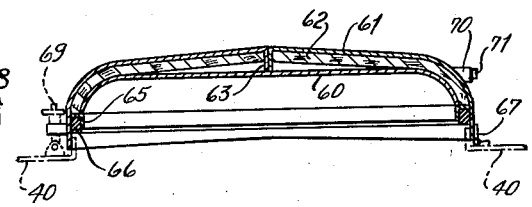
Figure 9:
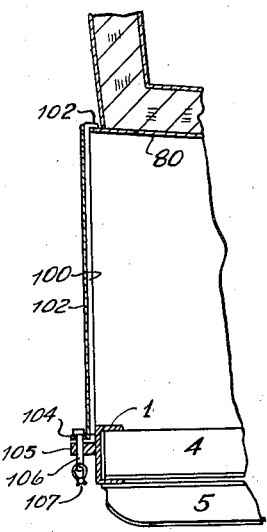
Figure 10:
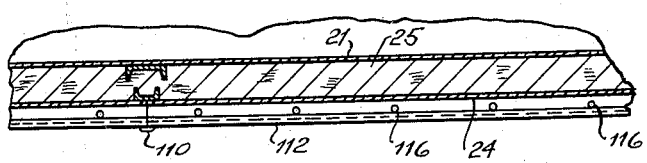
Figure 12:
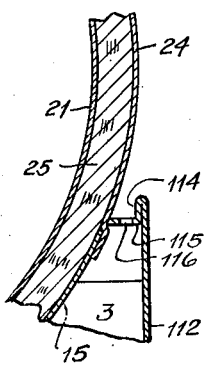
Figure 11:
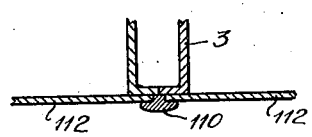

In the drawings, Fig. 1 is a plan of two of my tank bodies and a portion of a third body mounted on a railway flat car; Fig. 2 is a side elevation on a larger scale of one of such bodies so mounted and a portion of an adjacent body; Fig. 3 is a sectional elevation of the tank body, the lefthand half of the view being shown in vertical section and the right-hand half in elevation, as indicated by the line 3—3 on Fig. 1; Fig. 4 is a vertical transverse section of the tank body, as indicated by the line 4—4 on Fig. 1; Fig. 5 is a horizontal section through the base frame, indicated by the line 5—5 on Fig. 4; Fig. 6 is a detail of the base frame, being a vertical section on the offset plane indicated by the line 6—6 on Fig. 5; Fig. 7 is a plan of the man-hole cover; Fig. 8 is a vertical section of the man-hole cover, as indicated by the line 8—8 on Fig. 7; Fig. 9 is a vertical section through one of the doors of the valve pocket, as indicated by the line 9—9 on Fig. 2; Fig. 10 is a transverse section through the tank, as indicated by the lines 10—10 on Figs. 3 and 4; Fig. 11 is a horizontal section through one of the bolsters indicated by the lines 11—11 on Figs. 3 and 4; Fig. 12 is a view illustrating the construction of the shell and the upper portion of the removable side skirt, being an enlargement of corresponding parts shown in Fig. 4.

The base frame of the tank body is made up of end sills 1, which are preferably in the form of inwardly facing channel beams; longitudinal side sills 2, which are preferably angle beams with inwardly facing flanges; a series of transverse bolsters 3, resting at their ends on the flanges of the side sills, and longitudinal intermediate braces 4, which are inverted channel beams set into notches in the bolsters and having external flanges engaging the underface of the bolsters, as illustrated in Fig. 4.

Beneath the intermediate longitudinal beams 4 are skid rails 5 in the form of upwardly facing channels with outward flanges. The channels 4 and 5 are secured together by bolts or rivets passing through their flanges and through intermediate spacing plates 6. These spacing plates are arranged at intervals along the braces and skid rails, as shown in Fig. 5, and thus serve to allow slight warping of the frame without disturbing the continuous straight character of the skid rails. The space provided between the skid rail and beam by the spacing plate also serves for the passage of flat lattice tie bars 8, Fig. 5, which extend from the side sills to the end sills or from one side sill to the other and intermediately pass between the beams 4 and the skid rails, being welded to the edges of the beams in such regions.

The bolsters are preferably angle-shaped or flanged members arranged in pairs facing each other with the flanges abutting and welded together, which, when secured to the tank sheets, as hereinafter described, provides a hollow-box-like frame which is light and at the same time strong. The upper edge of the bolsters is concave to form a seat for the cradle sheet 15 which is welded to the bolsters and eventually becomes a portion of the outer shell of the tank, as about to be explained. This sheet 15 is stiffened by concave channel beams secured thereto directly above the bolsters, as illustrated at 16 in Fig. 3.

The tank 20 comprises a complete inner shell 21, an outer shell composed of the bolster shell 15, and an upper shell member 24, overlapping and secured to the bolster shell and intermediate insulation 25.

In assembling the tank on the base the insulation 25 is first applied over the bolster shell 15 with its channel braces 16, then the tank proper comprises the inner shell 21 surrounded by channel shaped braces 23, Fig. 3, is lowered into place on the insulation resting on the bolster shell. Then the insulation is completed on the upper portion of the tank and the internal bracing 26 is applied to the upper portion of the insulation and drawn down tightly. The lower ends of the braces 26 abut the braces 16, and are then welded to them. The sheets 23 of the outer shell 24 are then positioned on the braces 26 and in overlapping engagement with an edge to edge abutting relationship with each other in the region of the braces 26. These braces then serve to protect the insulation during the welding operation in which the sheets are joined to each other and to the lower shell. Obviously, the joining of the sheets 23 to each other also joins them to the bracing 26. The insulated tank per se above described is claimed in my divisional application No. 136,350, filed April 12, 1937.

It will be seen that I have provided a complete double shell tank with intermediate insulation, but the lower portion of the outer shell of the tank is rigidly attached to the bolsters so that there is no necessity for hold-down straps or other means for connecting the base and tank together.

The inner shell 21 is provided at its top with a rectangular opening surrounded by a wall 30 which is welded at its lower edge to the inner shell. At its upper edge there is an outwardly extending flange or ring 31 and then at the outer edge of this a downwardly extending flange or wall 32. This flange is abutted to the outer shell and braced by a channel-shaped ring 35 surrounding the man-hole and secured to the flange 32 and the outer shell.

Surrounding the upwardly extending man-hole wall described is a substantially flat plate 40 to form a catwalk about the opening. This plate is flanged downwardly at its edges at 41, and then outwardly at 42, the end portions 41 being concave so that the cat-walk construction rests snugly on the exterior shell 24 and is welded to that shell after insulation 45 has been placed on top of the shell and beneath the cat-walk plate.

It will be seen that the man-hole construction provides a very effective wall for the reception of the skirt of the usual cap 50, Fig. 4. That cap is readily accessible to an operator on the cat-walk, when the man-hole cover, about to be described, is turned back to idle position. The man hole features are claimed in my divisional application No. 136,351, filed April 12, 1937.

The man-hole cover, as illustrated in Figs. 3, 4, 7 and 8, is of flattened dome form comprising an inner shell 60, an outer shell 61, and intermediate insulation 62. The outer shell has two members with downturned flanges 63 abutting each other and secured together along the center line of the cover. Extending from these flanges outwardly and welded to the upper shell 61 of the cover are lateral braces indicated at 64 in Fig. 7. The two shells at their edges curve downwardly, the outer shell extending below the inner shell. The lower edge of the inner shell abuts an angle bar 65, which extends in rectangular course about the inside of the cover. The parts being welded together serve a very firm and stiff cover construction, well insulated, and at the same time comparatively light.

To the depending portion of the outer cover shell 61 are secured hinges 67, the other leaves of which are secured to the top plates of the cat-walk 40. On the side of the cover opposite the hinges I provide a pair of U-shaped brackets 68 which are adapted to receive bolts 69 hinged to the cat-walk on that side and provided with nuts to force the cover down tightly into place. The cover carries a rubber gasket 66 held between the flange 65 and the skirt of the sheet 61.

To hold the cover effectively in its open position, I secure to the upper sheet 61, a short distance above the hinges, a pair of bosses 70 which are adapted to carry rubber blocks 71, which impinge the cat-walk plate 40 when the cover is open.

When the tank is closed in use, the cap 50 is in place in the man-hole wall 30, the cover is held down by nuts on the bolts 69 with the rubber gasket 65 engaging the upper edge of the outward flange 31 of such wall. To obtain access to the tank, the operator standing on the cat-walk 40 merely loosens the nuts on the bolts 69, swings those bolts out of the bifurcated ears 68, tips back the cover till the rubber bumpers 71 engage the cat-walk on the other side, and then, by means of the flange 51 on the cap 50, may readily remove it manually, allowing access to the interior.

As heretofore mentioned, the discharge valve of the tank is contained within a pocket within the tank, as illustrated particularly in Figs. 3 and 4; that is to say, at one end of the tank adjacent the bottom, I divert the shells with the housed insulation to extend inwardly and slightly downwardly, as shown at 80, to form the top of the pocket, and then depend vertically at 81 to form the back of the pocket, while the sides of the pocket are composed of similar metal shells with intermediate insulation walls 82.

The valve 90, preferably of vertical plug form, occupies the pocket described, and has a flange which is welded to the back wall 81 of the pocket, so that the opening in the valve aligns with an opening 85 in such wall. The opening 85 in turn aligns with a longitudinal depression 86 in the inner shell 21 of the tank. This is an aid in draining, as near the finish of the draining operation, all the liquid flows into this groove and thus passes directly to the valve. This is particularly desirable when cleaning or rinsing the tank.

To protect the valve from cinders or dirt in transit, also to keep it shielded from snow in winter, or from the direct rays of the sun in summer, I provide a pair of doors 100, Figs. 2 and 9, which are hinged at their outer edges to the side walls of the pocket, as indicated at 101. The upper edges of these doors have inwardly extending flanges 102, which extend across the projecting undersheet of the pocket top 80, as shown in Fig. 9. One of the doors has a vertical batten 102 overlapping the edges of the other door. This batten at its lower end has an outward flange 104 adapted to stand above a bracket 105 on the end sill. A pin 106, Fig. 9, may be passed through registering openings in the flange and bracket and receive at its lower end a car seal 107, thus protecting the valve from unauthorized access.

The pocket construction described in addition to keeping the valve under seal and protecting it from dirt and heat and cold, has also the very decided advantage of preventing the valve striking anything and becoming displaced or injured during the transfer of the container from one vehicle to another.

While I have described and illustrated the discharge pocket and valve as located at one end of the tank, I contemplate the provision of discharge pockets and valves at both ends of the tank to facilitate discharge of the contents from either end thereof. Reference is made to my divisional application No. 136,349, filed April 12, 1937, for claims on the valve and pocket construction.

In order to make the exterior of the tank as readily cleanable as possible, and also to maintain its attracive appearance, I provide a special side skirting over the ends of the bolsters and reaching from the base to approximately the midregion of the tank. I provide this skirting in removable form, so that the trucker, if desired, may use the skirt walls as signs carrying his name or other data. As such plates may be readily changeable from time to time, it is easy to keep the skirt in unmarred condition. I also so arrange these skirts that they are not likely to be streaked by water dripping down from the upper portion of the tank. All of this will now be described with particular reference to Figs. 4, 10, 11 and 12.

On the vertical ends of the respective bolsters, I mount batten strips 110 which are connected by narrow portions to the bolsters, so as to leave vertical grooves on opposite sides. In these grooves seat the vertical ends of the side skirts 112. These skirts at their lower ends have inward ears or flanges, as shown at 113, Fig. 4, to extend beneath the flanges of the longitudinal sills 2. At their upper edges the sheets 112 are first doubled downwardly on themselves on their inner sides, as shown at 114 in Fig. 12, and then extend inwardly horizontally as at 115, the horizontal portion having a series of draining openings 116. The skirt plates 112 are sufficiently large so that they may be readily passed into place in the recess of the batten strips by bowing the plate outwardly centrally, which enables the flanges or ears 113 to pass beneath the longitudinal sill.

When the tank body is on the highway truck, for example, a very effective and attractive guard is provided by the side skirts, described, entirely hiding the bolster construction and protecting it from dirt, while water trickling down the sides of the tank will pass into the channel provided by the depressed inward portion 115 of the skirt and pass through the openings and be discharged behind the skirt. Accordingly, the skirts are not likely to be streaked by such water.

To enable ready access to the cat-walk 40 about the tank, I provide a removable combined ladder and extension walk which is normally stored in idle space beneath the tank. It will be seen from Fig. 4 that there are triangular openings 18 through the bolsters, and these provide ample space for the storage of the ladder. The ladder is shown in place in Fig. 4 at 120, and as stored by the broken lines at 120a.

The ladder comprises a pair of upright bars connected by rungs 122. Projecting from it near the lower end is a foldable plate 123 which has downwardly extending lugs 124 adapted to occupy ears secured to the side sill of the base frame. Some distance below the extreme top of the ladder is a plate 125 pivoted to the ladder and having downwardly extending pins 126 adjacent its inner end. These pins are adapted to occupy ears on the outer side of the cat-walk flange 41. The plate 125 is braced or flanged at its edges or otherwise made strong enough to enable it to support the operator as he passes from the ladder to the cat-walk.

In use, the ladder described rests at its lower end on the floor of the truck or platform which supports the container, as indicated at A' in Fig. 4. Thus, one may readily mount from such floor by means of the ladder to the upper end thereof and pass between the extensions of the side bars 120 onto the extension walk 125 and thence to the cat-walk 40. When the ladder is not in use, the extension walk 125 is swung substantially parallel to the ladder, as is also the lower brace 123, and then the entire construction may be shoved into the space provided by aligned bolster openings 18, as illustrated at 120a in Fig. 4.

In Figs. 1 and 2, I have indicated a car floor A, provided with transverse channels a to receive the skid rails 5 of the tank bodies. When in place on such floor, the bodies may be locked against lateral shifting by upright brackets a', the inner faces of which engage lugs 19 on the body base. The brackets being rigidly held in place in the upright position shown in Fig. 2, their faces prevent lateral shifting of the bodies. No claim is made herein to the car construction with the guiding channels and hinged brackets, but the construction shown and described in Patent No. 2,114,707, issued April 19, 1938, to Motor Terminals Company, may be employed, if desired.

The end sills of the body base are provided with suitable recesses with restricted entrance openings 17, Figs. 2 and 6, for the reception of flattened spherical ends of push-and-pull bars which may be connected at their other ends with any suitable mechanism to shift the body. It is to be understood that during this shifting the brackets a' are turned down outwardly to an idle position.

The push-and-pull bar feature just referred to is claimed in my copending application No. 32,130, filed July 18, 1935, now Patent No. 2,108,-813, issued February 22, 1938. It may also be noted that the particular construction of the skid rails and their surmounting brace beams is not claimed per se herein, but in my copending application No. 39,726, filed September 9, 1935.

I claim:

1. The combination of a cradle frame including bolsters, a concave shell supported directly by the bolsters, insulation on top of the shell, a horizontal tank supported on the insulation and centered laterally thereby, a separate outer upper sheet-metal shell section surrounding the upper and side portions of the tank and having its lower edges operatively secured rigidly to the bolsters in a manner to hold the tank down on the insulation, side skirts at the ends of the bolsters extending above the bolster tops outside of the anchorage of the upper shell.

2. The combination with bolsters, a shell overlying the tops of the bolsters and connected thereto, insulation on the upper side of the bolster shell, a tank resting on the insulation, and an outer upper shell for the tank connected at its lower edges to the bolster shell, side skirts secured to the ends of the bolsters and extending above them and draining gutters beween the upper portion of the side skirts and the outer shell of the tank.

3. The combination of transverse bolsters, a horizontal tank resting thereon, side skirts at the ends of the bolsters extending above the tops thereof, and gutters above the bolsters and between the side skirts and the tank.

4. The combination with a set of transverse bolsters, of a double walled tank resting on the bolsters having the under portion of its outer shell rigid with the tops of the bolsters, and side sheets mounted on the bolster ends terminating at the top adjacent the outer shell of the tank but in spaced relation thereto and with draining spaces behind them so that water will not run from the upper tank surface downwardly over the exposed faces of the sheets.

5. The combination of a double shell tank, transverse bolsters secured to the outer shell of the tank, side skirts secured to the ends of the bolsters and extending upwardly to a region adjacent but slightly outside of the outer shell of the tank, such skirts being at the top bent downwardly and inwardly to provide a gutter between the side skirt and tank, there being draining openings through the bottom of the gutter.

BENJAMIN F. FITCH.